United States Patent
Loeffler et al.

(10) Patent No.: US 11,186,038 B2
(45) Date of Patent: Nov. 30, 2021

(54) 3D PRINTING MECHANICAL HOLD BUILD PLATE

(71) Applicant: University of Florida Research Foundation, Inc., Gainesville, FL (US)

(72) Inventors: John Michael Loeffler, Boca Raton, FL (US); Brandon Rosenthal, Tallahassee, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 161 days.

(21) Appl. No.: 16/526,078

(22) Filed: Jul. 30, 2019

(65) Prior Publication Data

US 2019/0351619 A1    Nov. 21, 2019

Related U.S. Application Data

(63) Continuation of application No. 15/228,077, filed on Aug. 4, 2016, now Pat. No. 10,406,759.

(60) Provisional application No. 62/201,249, filed on Aug. 5, 2015.

(51) Int. Cl.
    *B29C 64/386*    (2017.01)
    *B29C 64/245*    (2017.01)
    *B29K 67/00*     (2006.01)
    *B29K 55/02*     (2006.01)
    *B29C 64/118*    (2017.01)

(52) U.S. Cl.
    CPC ......... *B29C 64/245* (2017.08); *B29C 64/118* (2017.08); *B29K 2055/02* (2013.01); *B29K 2067/046* (2013.01)

(58) Field of Classification Search
    CPC .................................................. B29C 64/245
    See application file for complete search history.

(56) References Cited

U.S. PATENT DOCUMENTS

| | | | |
|---|---|---|---|
| 2010/0283172 A1* | 11/2010 | Swanson | B29C 64/255 264/80 |
| 2011/0241947 A1 | 10/2011 | Scott et al. | |
| 2012/0189729 A1* | 7/2012 | Pax | B29C 64/176 425/378.1 |
| 2014/0061974 A1* | 3/2014 | Tyler | B33Y 80/00 264/401 |
| 2016/0144563 A1* | 5/2016 | Elliott | B29C 64/118 264/401 |
| 2016/0176118 A1 | 6/2016 | Reese et al. | |

FOREIGN PATENT DOCUMENTS

CN           203779872 U  *  8/2014

OTHER PUBLICATIONS

Lai Zhouyi CN203779872,U English machine translation, Aug. 2014 (Year: 2014).*

* cited by examiner

*Primary Examiner* — Joseph A Miller, Jr.
(74) *Attorney, Agent, or Firm* — Thomas I Hostemeyer, LLP

(57) ABSTRACT

The present disclosure provides a build plate for physically adhering or holding a three-dimensional (3D) object to a build surface and methods for mechanically anchoring the 3D object to the build surface using printing or building materials. In one embodiment, a build plate comprises a plurality of anchor holes spaced throughout a top surface of the first build plate, in which an individual anchor hole comprises a top hole portion and a bottom chamfer hole portion that is larger in size than the top portion.

18 Claims, 5 Drawing Sheets

3D PRINTING MECHANICAL HOLD BUILD PLATE

CROSS-REFERENCE TO RELATED APPLICATION

This application is a continuation of, and claims priority to, U.S. Patent Application entitled "3D PRINTING MECHANICAL HOLD BUILD PLATE," filed on Aug. 4, 2016, and assigned application Ser. No. 15/228,077, which claims priority to U.S. provisional application entitled, "3D Printing Mechanical Hold Build Plate," having Ser. No. 62/201,249, filed Aug. 5, 2015, both of which are entirely incorporated herein by reference.

TECHNICAL FIELD

The present disclosure is generally related to three-dimensional object printing.

BACKGROUND

Generally, three-dimensional (3D) object printing involves laying down successive filament layers on a build platform until an entire 3D object is created. For example, a polymer filament maybe extruded layer by layer onto a build platform by a 3D printer. FDM (Fused Deposition Modeling) is a 3D printing process were a thermoplastic is extruded to form the layers by which an object it produced. However, a common problem is that the 3D object does not adhere to the build platform during printing and will pop up off the build platform which may cause the object to fail. This issue limits how large a part can be manufactured using 3D printing techniques, such as in FDM, since the printing of large objects (e.g., having a footprint of 6-7 square inches) typically suffers from this problem.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure provide a build plate for physically adhering or holding a three-dimensional (3D) object to a build surface and methods for mechanically anchoring the 3D object to the build surface using printing or building materials. Unlike many conventional adhesion techniques, embodiments of the present disclosure are not limited in use of filament and building materials that do not have a high coefficient of thermal contraction, since the printed 3D object is not relying on adhesion to hold the object in place and is thus not limited by thermal contraction.

Figure 1:
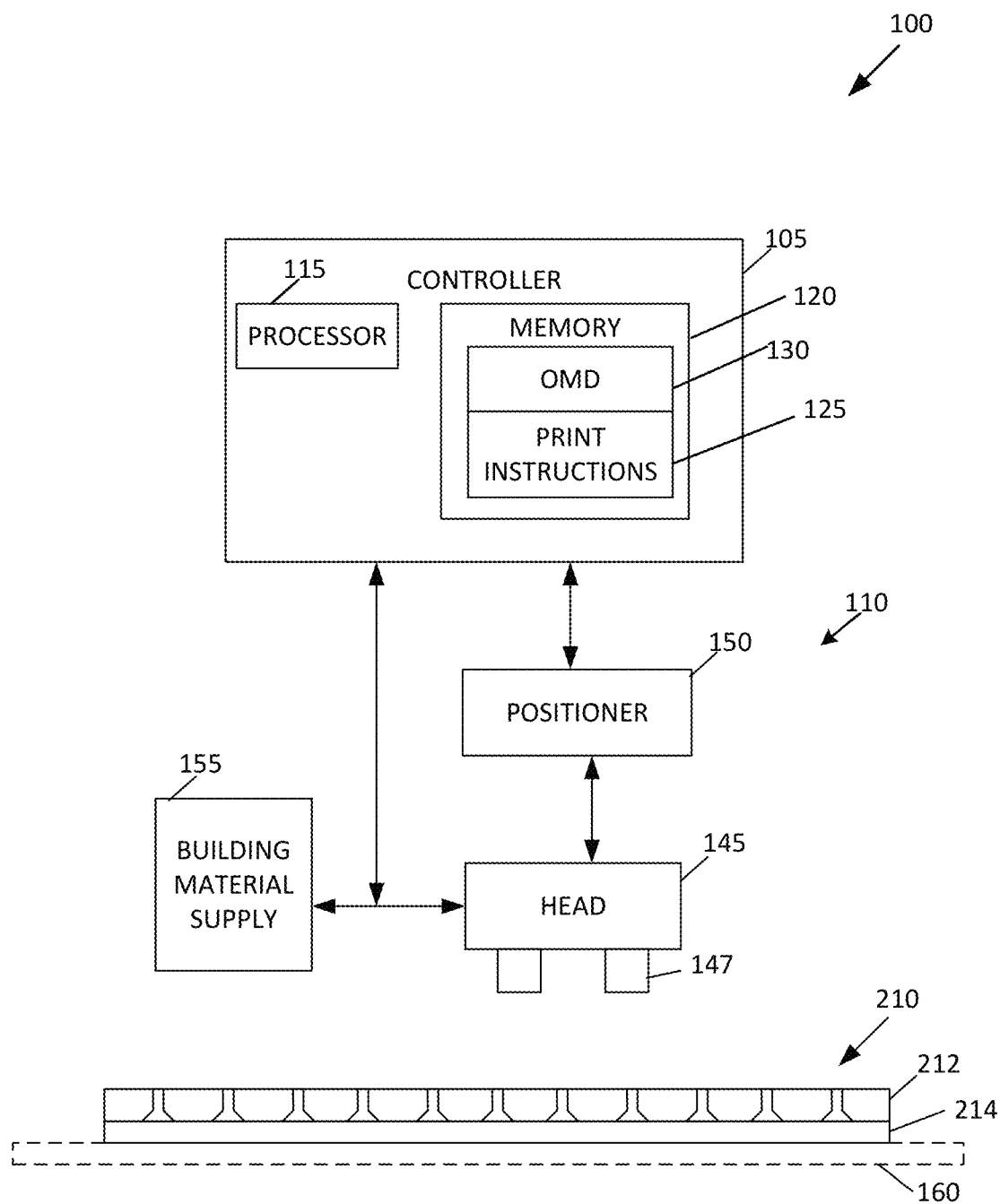
FIG. 1 is a block diagram of a three-dimensional printer system in accordance with an embodiment of the present disclosure.

Referring now to FIG. 1, a block diagram of a 3D printer system 100 in accordance with an embodiment of the present disclosure is shown. The 3D printer system 100 includes a controller 105 and printing apparatus 110. Controller 105 is configured to prepare digital data that characterizes a 3D object for printing, and control the operation of the printing apparatus 110. The controller 105 may include, for example, a processor 115, a memory unit 120, and print instructions 125. Data and instructions maybe transferred between controller 105 and a CAD (computer-aided design) module (not shown), between controller 105 and printing apparatus 110, and/or between controller 105 and other system elements. Controller 105 may be suitably coupled and/or connected to various components of printing apparatus 110.

Controller 105 may utilize object modeling data (OMD) 130 representing an object to be printed. Controller 105 may convert such data to instructions for the various units within 3D printer system 100 to print a 3D object. Controller 105 may be located inside printing apparatus 110 or outside of printing apparatus 110. Controller 105 may be located outside of printing system 100 and may communicate with printing system 100, for example, over a wire and/or using wireless communications. In some embodiments, controller 105 may include a CAD module/system or other suitable design system. In alternate embodiments, controller 105 may be partially external to 3D printer system 100. For example, an external control or processing unit (e.g., a personal computer, workstation, computing platform, or other processing device) may provide some or all of the printing system control capability.

In some embodiments, print instructions 125, a print file, or other collection of print data may be prepared and/or provided and/or programmed, for example, by the controller 105 or a computing platform connected to 3D printer system 100. The print instructions 125 may be used to determine, for example, the order and configuration of deposition of building material via, for example, movement of and activation and/or non-activation of one or more nozzles 147 of printing head 145, according to the 3D object to be built. In accordance with the present disclosure, the print instructions 125 may further be configured to determine positioning of anchoring points to be formed from deposited building material and anchoring members around a perimeter of a 3D object. In one embodiment, the print instructions comprise, but are not limited to, G-code toolpath instructions for the controller.

Printing apparatus 110 may include positioner(s) 150, building material supply unit(s) 155, printing head(s) 145, printing nozzle(s) 147, and a build platform 160, among other components. Positioner 150 may control the movement of printing head 145, such as by servomotor(s) or stepped motor(s).

Controller 105 may be implemented using any suitable combination of hardware and/or software. In some embodiments, controller 105 may include, for example, the processor 115, the memory unit 120, and software or operating instructions, such as print instructions 125. Processor 115 may include conventional devices, such as a Central Processing Unit (CPU), a microprocessor, a "computer on a chip", a micro controller, etc. Memory unit 120 may include conventional devices such as Random Access Memory (RAM), Read-Only Memory (ROM), or other storage devices, and may include mass storage, such as a CD-ROM, SD/Micro SD, USB storage devices, or a hard disk. Controller 105 may be included within, or may include, a computing device such as a personal computer, a desktop computer, a mobile computer, a laptop computer, a server computer, or workstation (and thus part or all of the functionality of controller 105 may be external to 3D printer system 100). Controller 105 may be of other configurations, and may include other suitable components.

According to some embodiments, building material supply unit(s) 155 may supply building materials to printing apparatus 110. Building materials may include any suitable kind of object building material, such as, for example, photopolymers, plastics, metals, and may include modeling material, support material and/or release material, or any alternative material types or combinations of material types. In some embodiments, the building materials used for construction of the 3D object are in a plastic filament form which is unwound from a coil supplying material to an extrusion nozzle 147, in which the extrusion is driven by a drive mechanism of the extruder drive system of the printing head 145. The nozzle 147 is heated to melt the material and can be moved in horizontal, forward/backward, and/or vertical directions by the positioner mechanism 150. The object is produced by extruding solid material through the drive mechanism where it is melted by the nozzle 147 to form layers that harden immediately after extrusion. This technology is referred as Fused deposition modeling (FDM) and is most widely used with two plastic filament material types: ABS (Acrylonitrile Butadiene Styrene) polymer material and PLA (Polylactic acid) polymer material but many other materials are available ranging in properties from wood filed, conductive, flexible, etc. While ABS is typically printed on printers having a heated build chamber, embodiments of the present disclosure can successfully print objects using ABS without a heated build chamber. Other print technologies such as SLA (Stereolithography) or ones that utilize an ultraviolet (UV) curable liquid as the print material are also available to be used with embodiments of the present disclosure.

As previously mentioned, a common problem in 3D printing is that the 3D object does not adhere to a build surface, e.g., build platform 160, during printing and pops up off the build platform 160 which may cause the object to fail to print. According to embodiments of the present disclosure, methods and structural components are provided to keep a printed object firmly secured to the build surface, possibly minimizing or preventing deformation of a 3D object during and/or after printing, and/or providing other benefits.

Figure 2:
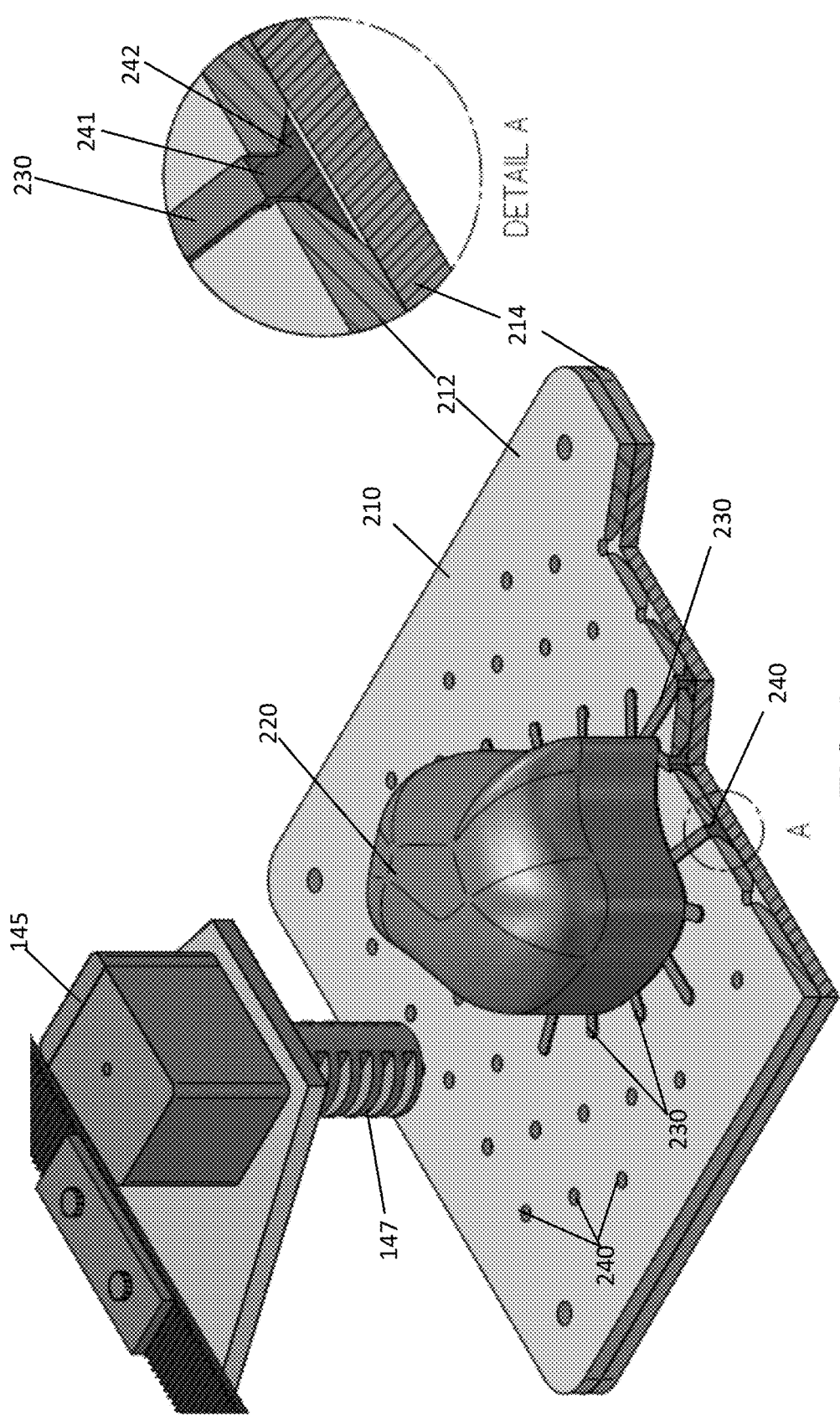
FIGS. 2-4 are diagrams schematic illustrating an exemplary 3D printing hold build plate assembly in accordance with an embodiment of the present disclosure.
Figure 3:
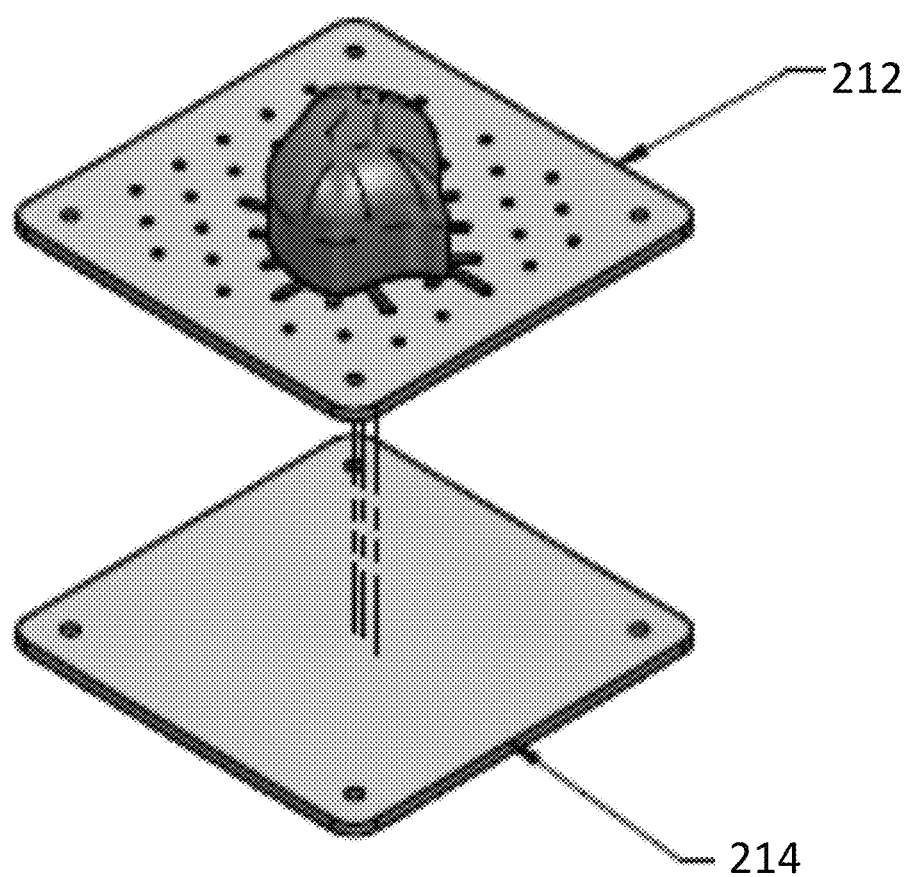
Figure 4:
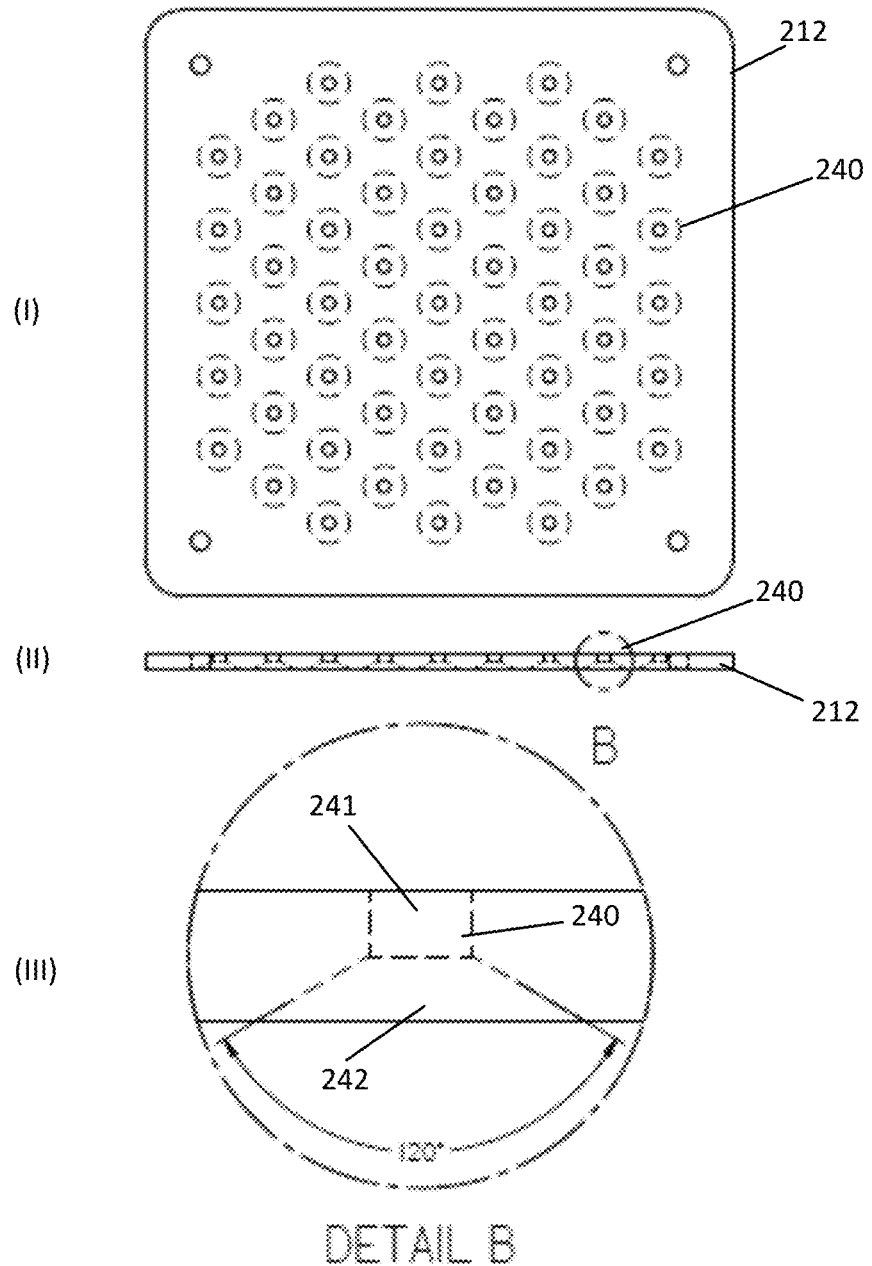

Reference is now made to FIG. 2 which is a schematic illustration of an exemplary 3D printing hold build plate assembly 210 in accordance with an embodiment of the present disclosure and a 3D printer system 100. The 3D printer system 100 includes a printing head 145 and nozzle 147 from which building material is being deposited on a top surface of the hold build plate assembly 210 to form a 3D object 220. In one embodiment, the printing head 145 includes various components, such as an extruder drive system for feeding/supplying building material (e.g., filament) to the nozzle 147. As represented in the figure, the 3D object 220 is anchored in position by anchoring members 230 mechanically secured to the hold build plate assembly 210 via a mechanical hold, such as anchor holes 240 featured on a top portion 212 of the hold build plate assembly 210 or raised surfaces (such as a peg, a post, lip, etc.) to which anchoring members 230 can be mechanically fastened or affixed. As such, the hold build plate assembly 210 contains a top plate 212 and bottom plate 214, as also shown in the alternative views of FIGS. 3-4. In one embodiment, the top plate 212 has a series of mechanical holds in the form of anchor holes 240 spaced throughout a top surface. In one embodiment, a top hole portion 241 of the hole 240 corresponds to, but is not limited to, a diameter-size of an orifice of the nozzle 147 having a circular shape and a bottom hole portion 242 of the hole 240 comprises a chamfer (e.g., countersunk hole) having a larger diameter-size than the top hole portion 241, as illustrated in the exploded views of FIG. 2 and FIG. 4. For example, in some embodiments, the top portion 241 of the anchor hole 240 may be the same as or larger than the diameter-size of the orifice of the nozzle 147. Also, in alternative embodiments, the hole 240 may comprise a counterbore shape or non-circular shapes, such as an oval, polygon, etc., among others.

As an illustrative example, at a beginning of a 3D print build, the extruder drive system of the printing head 145 extrudes filament building material into a top hole portion 241 of an anchor hole 240 in which the filament building material will expand out and anchor the building material being deposited to the hold build plate assembly 210. Accordingly, the printing head 145 may move and branch off to deposit additional building material to establish a first layer of an object 220 being printed and/or to establish an additional anchor point around a perimeter of the build object 220.

As the building material expands within a bottom hole portion 242 of the anchor hole 240, the building material is unable of being removed or pulled through the top hole portion 241 of the anchor hole 240 thereby mechanically locking the build material and the 3D object 220 in place. After the 3D object 220 is printed, the anchor members 230 connecting the building material in the anchor holes 240 with the base of the 3D object 220 can be snipped or cut free to allow for removal of the object 220 from the hold build plate assembly 210. In various embodiments, the anchor holes 240 used to lock the object 220 in place may be directly under the object 220 or may be in positions around a perimeter of the object and connected to the object 220 with an anchoring member 230 (e.g., line of building material). As discussed, after the object 220 has been removed, the remaining building material that was used for anchoring the object 220 can be pulled through the anchoring holes 240 from underneath a top plate 212 of the hold build plate assembly 210. For example, the branches or members 230 from the anchor hole 240 to the print object 220 are the same diameter as the top hole portion 241 of the anchor holes 240 and therefore can be pulled through the hole 240 from the chamfer portion 242 of the hole 240. Accordingly, the hold build plate assembly 210 is designed and intended to be reused for additional print/build jobs.

A mechanical hold provided by an exemplary embodiment of the hold build plate assembly 210 is stronger than conventional methods of physical and thermal adhesions. Therefore, technology using an exemplary embodiment of the hold build plate assembly 210 can lead to printing larger build objects and also employing new building materials that are susceptible to greater thermal contraction, such as ABS (Acrylonitrile Butadiene Styrene) material.

Although in some embodiments, the top plate 212 may be of a type of material or finish that provides adhesion for the build material, such as metal, acrylic, or glass, among others, the hold build plate assembly 210 does not rely on adhesion to hold a build object 220 in place. Correspondingly, a heated build chamber may also be used with the hold build plate assembly 210, in one embodiment. In such an embodiment, heat may be applied during a beginning of a print job to help printing get started and then turned off after anchors have been positioned in the respective anchor holes 240 for the print object 220. In one embodiment, adhesion of the building material is not preferred, so embodiments of a bottom plate 214 of a hold build plate assembly 210 utilize material(s) having low adhesion properties. Embodiments of the hold build plate assembly 210 may be smaller than a size of build platform on which it is supported or may be the same size. Further, in some embodiments, the build platform 160 may function as a bottom plate of the hold build plate assembly 210 where a top plate 212 having anchoring holes is positioned on top.

Figure 5:
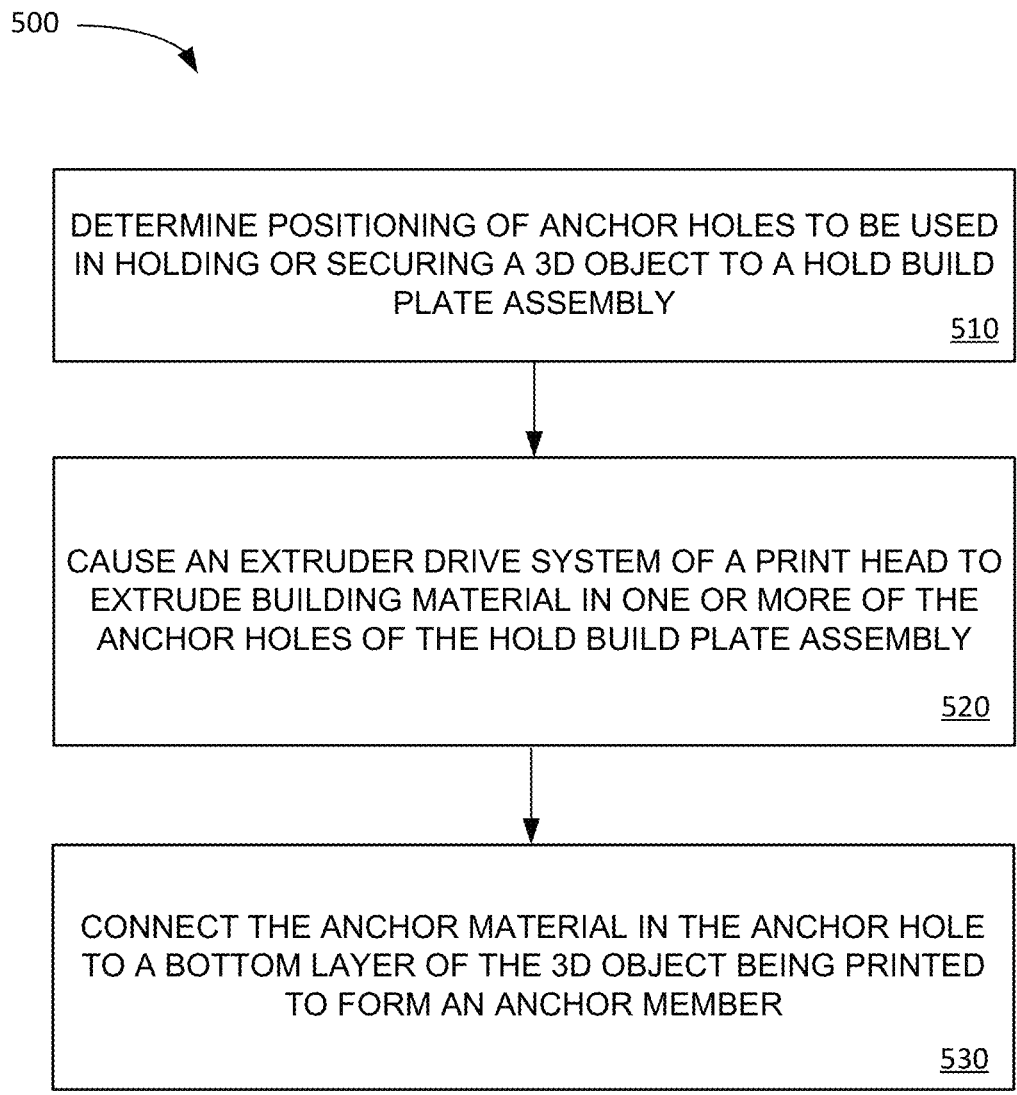
FIG. 5 is a flow chart diagram of an exemplary 3D printing method in accordance with an embodiment of the present disclosure.

The flow chart of FIG. 5 shows the architecture, functionality, and operation of a possible implementation of the print instructions or software 125 (FIG. 1). In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

Referring now to FIG. 5, an exemplary anchoring method 500 for a three-dimensional print/build object 220 using mechanical holds in the form of anchor holes 240 is described. As noted, other forms of mechanical holds may also be utilized in various embodiments, including raised surfaces such as a peg or post. The anchoring method 500 of FIG. 5 comprises determining (510) positioning of anchor holes 240 to be used in holding or securing a 3D object 220 to a hold build plate assembly 210. In some embodiments, a 3D scanner may be used to detect or find available anchor hole positions. In alternative embodiments, the print instructions 125 may provide a layout of anchor holes 110 as predetermined by specific homing/pattern on the hold build plate assembly 210 and/or use of a hall-effect probe. Further, in some embodiments, a 3D printer may be provided a data model of the hold build plate assembly 210 or at least a top plate of the hold build plate assembly 210. Further, the controller 105 may determine positioning of the anchor holes 240 based on print data 125 or object model data 130 for the object to be printed, including the prospective size and shape of the object. After determining the desired positioning of the anchor holes 240, the controller 105 causes (520) an extruder drive system of a printing head 145 to extrude building material in one or more of the anchor holes 240 of the hold build plate assembly 210 to form an anchor and connect (530) the anchor material in the anchor hole 240 to a bottom layer of the 3D object 220 being printed to form an anchor member 230.

By utilizing a mechanical hold via the hold build plate assembly 210, objects 220 may be printed of a large size without concern for previous adhesion issues, such as thermal contraction, among others. Further, with techniques of the present disclosure, objects 220 can be successfully printed in different orientations, where these different orientations would likely fail if adhesion is the primary method to secure the objection to the build platform. Due to the hold build plate assembly 210 and related methods utilizing a mechanical hold to secure the print object 220, the object 220 is held in place with the strength of the building material itself and does not require an adhesion with the build surface. Additionally, there may be a reduction in failed print jobs, since techniques of the present disclosure are more tolerant of issues that caused warping than previous methods.

Techniques of the present disclosure can also lead to a reduction in operational costs, such as the reduction of heating element part(s) and/or related energy usage. Techniques of the present disclosure can also take advantage of different printing materials, such as print filaments having a high coefficient of thermal contraction. Correspondingly, the building material is easy to remove from the hold build assembly without the necessity of adhesion necessarily being used to secure the building material to the hold build plate assembly 210 in one embodiment. This may also provide for reduced risk of injury related to removal of the building materials. Further, embodiments utilizing a 3D printer system without a heated build chamber are safer for novices or persons of adolescent age to interact with 3D printing system, since the risk of heat related injuries is removed.

Certain embodiments of the present disclosure can be implemented in hardware, software, firmware, or a combination thereof. In one embodiment, the print instructions 125 are implemented in software or firmware that is stored in a memory and that is executed by a suitable instruction execution system. If implemented in hardware, as in an alternative embodiment, the print instructions can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present disclosure are merely possible examples of implementations, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure and the following claims.

Therefore, at least the following is claimed:

1. A method comprising:
providing a hold build plate apparatus, wherein the hold build plate apparatus comprises a first build plate adapted to support a printed object during a three-dimensional (3D) print job, wherein the first build plate comprises a plurality of anchor holes spaced throughout the first build plate and extending from a top surface of the first build plate to a bottom surface of the first build plate, wherein an individual anchor hole comprises a top hole portion and a bottom chamfer hole portion that is larger in size than the top hole portion;
determining, by a controller of a 3D printer, positioning of the anchor holes to be used in securing the printed object to the first build plate, wherein positioning of the anchor holes are determined by detecting, by the controller of the 3D printer, available anchor holes around a perimeter of the printed object, wherein the available anchor holes are detected by scanning, via a 3D scanner, the first build plate for anchor hole positions;
causing, by the controller of the 3D printer, a print head of the 3D printer to extrude building material in one or more of the anchor holes of the first build plate at one or more determined positions; and connecting, by a print head of the 3D printer, the extruded anchor material in the anchor hole to a bottom layer of the printed object to form an anchor member.

2. The method of claim 1, wherein a size of the top hole portion is the same as a size of a nozzle orifice of the print head of the 3D printer performing the 3D print job.

3. The method of claim 1, further comprising determining, by the controller of the 3D printer, the positioning of the anchor holes from a data model of the first build plate.

4. The method of claim 1, further comprising forming, by the 3D printer, a plurality of anchors around a perimeter of the printed object, wherein individual anchors are connected to the printed object via individual anchor members.

5. The method of claim 1, wherein the building material comprises Acrylonitrile Butadiene Styrene polymer.

6. The method of claim 1, wherein the building material comprises Polylactic acid polymer.

7. The method of claim 1, further comprising:
removing the printed object from the first build plate by cutting the anchor member that is connected to the printed object; and
cleaning the first build plate after removal of the printed object by pulling remaining anchor material through the anchor hole.

8. The method of claim 1, wherein the first build plate comprises a metal, acrylic, or glass material.

9. The method of claim 1, wherein the hold build plate apparatus further comprises a second build plate adapted to support the first build plate during the 3D print job.

10. The method of claim 9, wherein the second build plate comprises a material that is different from the material of the first build plate.

11. The method of claim 10, wherein the second build plate comprises a material that does not allow for adhesion of building material in the 3D print job with the second build plate.

12. The method of claim 9, wherein the second build plate comprises a build platform of a 3D printer performing the 3D print job.

13. The method of claim 1, wherein the first build plate comprises at least one structure having a raised surface on the top surface of the first build plate, the method further comprising anchoring, by the 3D printer, the printed object to the at least one structure.

14. The method of claim 1, wherein the available anchor holes are detected by analyzing, by the controller of the 3D printer, a data model of the first build plate for anchor hole positions for a layout of the anchor holes on the first build plate.

15. The method of claim 1, wherein the building material is extruded in at least one anchor hole directly under the printed object.

16. The method of claim 1, further comprising applying heat during an initial portion of a print job for the printed object and turning off the heat after the anchor material in the anchor hole has been connected to the printed object.

17. The method of claim 13, wherein the at least one structure having a raised surface comprises a post structure.

18. The method of claim 13, wherein the at least one structure having a raised surface comprises a lip.

* * * * *